United States Patent [19]

Miller

[11] 4,419,829
[45] Dec. 13, 1983

[54] HEAD FOR BORE GAUGE

[75] Inventor: Mark H. Miller, Johnston, R.I.

[73] Assignee: Federal Products Corporation, Providence, R.I.

[21] Appl. No.: 288,985

[22] Filed: Jul. 31, 1981

[51] Int. Cl.³ .......................... G01B 5/08; G01B 7/12
[52] U.S. Cl. ................................ 33/178 R; 33/178 E; 33/147 K; 33/149 J; 33/143 L
[58] Field of Search ............ 33/178 R, 178 E, 147 K, 33/147 N, 149 J, 143 L

[56] References Cited

U.S. PATENT DOCUMENTS

| 1,671,168 | 5/1978 | Steinle | 33/178 |
|---|---|---|---|
| 2,424,497 | 7/1947 | Nilsson | 33/178 R |
| 2,565,844 | 8/1951 | Eisele | 33/178 R |
| 2,930,134 | 3/1960 | Bishop et al. | 33/178 |
| 3,103,748 | 9/1963 | Emery | 33/178 |
| 3,418,720 | 12/1968 | Worthen | 33/147 |
| 3,422,540 | 1/1969 | Worthen | 33/143 |
| 3,442,020 | 5/1969 | Worthen | 33/178 |
| 3,762,057 | 10/1973 | Kaifesh | 33/147 |
| 3,995,374 | 12/1976 | Fisk | 33/178 |
| 4,030,202 | 6/1977 | Fadl et al. | 33/178 |
| 4,045,877 | 9/1967 | Rutter | 33/178 |
| 4,170,831 | 10/1979 | Olasz | 33/178 |

Primary Examiner—Willis Little
Attorney, Agent, or Firm—Morse, Altman & Dacey

[57] ABSTRACT

A head assembly is provided for use in a bore gauge and is adapted to actuate either a mechanical readout, such as a dial indicator, or an electrical readout, such as a linear variable differential transformer connected to a digital display. A U-shaped centralizing arm pivoted to the head body is provided with a pair of floating centralizing ball contacts. A first measuring ball contact is mounted at the outer end of a rack and pinion extensible stem adapted to be adjusted as to radial extension and a second measuring ball contact is mounted on a resiliently mounted finger which drivingly engages a transfer rod. The transfer rod is operatively connected to the readout device whether a dial indicator or an LVDT. A ball and groove driving arrangement is provided between the transfer rod and the pivotal finger.

26 Claims, 14 Drawing Figures

HEAD FOR BORE GAUGE

BACKGROUND OF THE INVENTION

1. Field of the Invention

This invention relates generally to measuring instruments and more particularly is directed towards a new and improved head assembly for use with bore gauges of mechanical or electronic construction.

2. Description of The Prior Art

A bore gauge is an instrument designed to measure inside diameters of various cylindrical bores. Machinists, for example, frequently need to make precise measurements of the diameter of a bore being cut into a workpiece. Since the sensing contact of a bore gauge typically has a relatively small range of motion, the effective measurement range of the instrument can be increased by providing an extensible stem directly opposite the sensing contact of the gauge. Such stems heretofore have been in the form of screws that are turned in or out as required with the particular setting being established by inserting the head of the bore gauge in a reference ring selected to correspond approximately with the diameter of the bore to be measured. Once the bore gauge has been set in the reference ring, the head of the instrument is then inserted in the bore itself and a reading is made, typically on a dial indicator mechanically connected to the measuring head.

While this type of instrument is known in the art as exemplified by the following U.S. Pat. Nos. 3,418,720, 3,442,020, 3,422,540, 4,030,202 and 4,170,831, these instruments have been somewhat difficult to use and maintain. For example, the initial setting of the extensible stem is quite slow and may require several adjustments before the stem is correctly extended and locked as by turning a locking nut, which sometimes will cause an accidental movement of the stem. Also, the contacts used both for centralizing the instrument along the diameter of the bore as well as the measuring contacts themselves tend to wear rather rapidly. Likewise, other moving parts tend to experience rather rapid wear resulting in deterioration in the accuracy of the instrument. A further disadvantage of existing bore gauges of this type has been the tendency of parts to become clogged with debris insofar as the instruments are used frequently around machining operations where liquid coolants and the like may be present.

Accordingly, it is a general object of this invention to provide improvements in bore gauges. Another object of this invention is to provide a measuring head for a bore gauge adapted to actuate either a mechanical instrument such as a dial indicator or an electrical instrument such as a linear variable differential transformer coupled to an electrical digital display. A further object of this invention is to provide in a bore gauge a head that may be quickly and easily set in a reference ring prior to use in measuring a bore. Still another object of this invention is to provide in a bore gauge a head that is easily cleaned, is long wearing and requires a minimum amount of maintance while providing very reliable, repeatable and precise measurements.

SUMMARY OF THE INVENTION

This invention features a head for use in a bore gauge, comprising an elongated body portion, a spring biased U-shaped centralizer arm pivoted to the body portion and carrying a pair of floating ball contacts which bear directly against flat faces of the body portion and bore walls during a centralizing manipulation of the instrument. A spring mounted finger is mounted to the body portion and is provided with a ball contact at the distal end thereof for contacting the work surface and a second ball at an inner portion thereof engaging one end of a transfer rod, the opposite end of the rod drivingly connected to a dial indicator, LVDT or the like. Aligned with the sensitive ball contact and on the opposite side of the head is an extensible stem carrying a ball contact at the outer end thereof and movable by means of a rack and pinion arrangement for quickly setting the stem, as required. Relatively large clearances between major moving components prevent binding of the parts in the presence of debris and facilitate cleaning thereof.

DETAILED DESCRIPTION OF THE PREFERRED EMBODIMENTS

Figure 1:
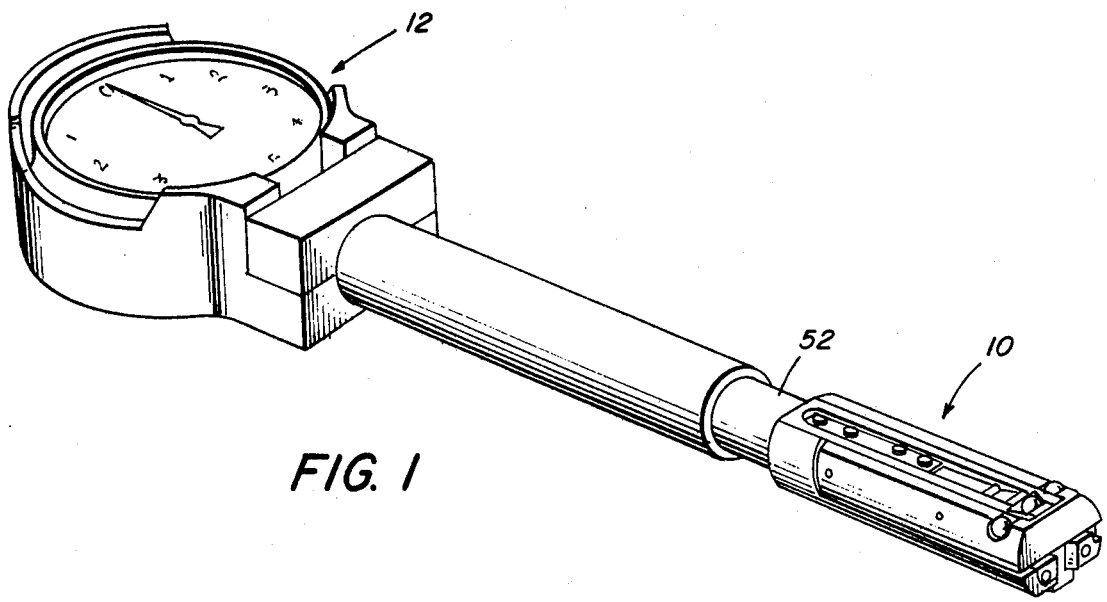
FIG. 1 is a view in perspective showing a bore gauge head made according to the invention and in use with a dial indicator.
Figure 2:
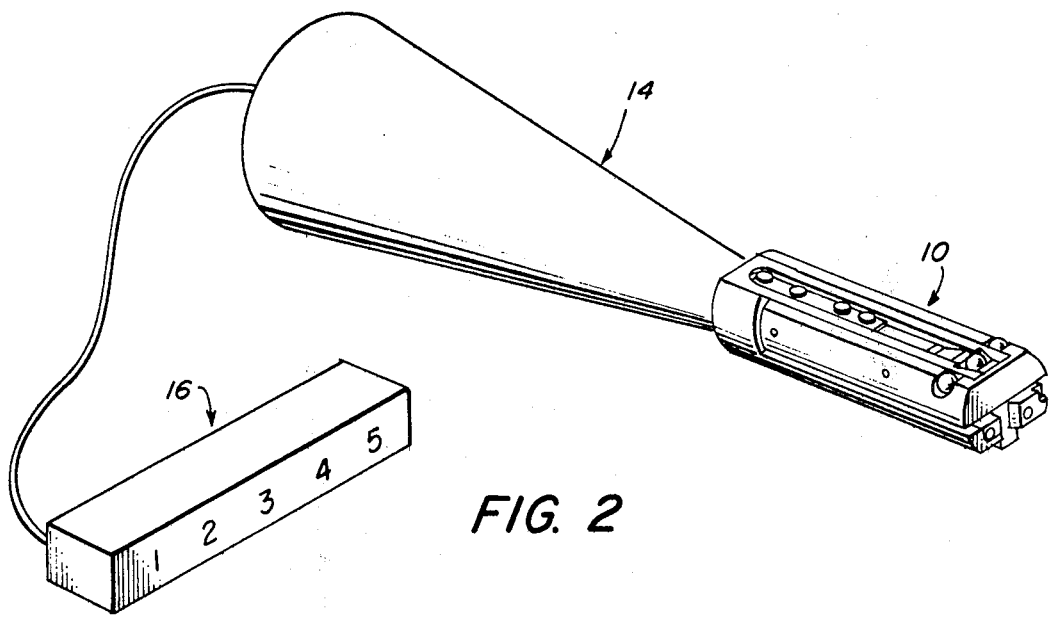
FIG. 2 is a view similar to FIG. 1 but showing the head in use with a linear variable differential transformer.

Referring now to the drawings, the reference character 10 generally indicates a bore gauge head adapted for use with a dial indicator 12, as shown in FIG. 1, or with linear variable differential transformer 14 having a digital electronic display 16, as suggested in FIG. 2. In either event, the head assembly is organized about a body 18, best shown in FIG. 3, of generally cylindrical contours at the rearward or left hand end thereof, but formed with matching cutaway portions 20 and 22 extending forwardly along both sides of the body to define a pair of longitudinal flat shoulders 24 and 26. The cutaway portions 20 and 22 also define a pair of flat faces 28 and 30 perpendicular to the shoulders 24 and 26. The body 18 is also bifurcated lengthwise by a longitudinal slot 32 extending from the cylindrical inner portion to the distal end thereof to form thereby a pair of spaced parallel walls 34 and 36. Communicating with the slot 32 is a shallow recess 37 at the inner end of the body at the base of the slot to receive a leaf spring 38 fastened by screws 40 and 42 threaded into cooperating tapped holes 44 and 46 in the face of the recess 37. The leaf spring 38 serves as a pivotal and resilient support for a sensing finger 48 dimensioned to fit with ample clearance within the slot 32.

The body 18 is also formed with a threaded neck 50 at the left hand inner end thereof for mounting the head assembly to an extension shank 52 of a dial indicator, as shown in FIG. 1 or to an end of the LVDT as shown in FIG. 2.

The body is also formed with an axial passage 54 extending through the neck 50 and into the slot 32 to slidably receive a transfer rod 56 shown in detail in FIGS. 8 through 11. The left hand end of the transfer rod 56, as viewed in the drawings, is adapted to drivingly engage an actuating stem on the dial indicator 12 or the movable part of the LVDT 14. The right hand end of the transfer rod drivingly engages a hard metal ball 58 carried by the sensitive finger 48 and shown best in FIG. 4. It will be understood that any motion of the sensitive finger 48 about its flex joint provided by the leaf spring 38, which motion will be arcuate, will be converted to a linear motion via the ball 58 to the transfer rod which will move along the axis of the rod and thereby produce a readout on the dial indicator, LVDT, or the like.

The transfer rod 56 at its left hand end rides in a bushing 60, typically bronze or the like, while the right hand end is supported on one side by means of a pin 62 mounted transversely to the body 18 near the forward end thereof and across the lower part of the slot 32. The distal end of the transfer rod 56 is formed with a smooth lower face 64 bearing against the pin 62 and formed with a central longitudinal groove 66 defining a pair of parallel longitudinal narrow lands 68 and 70. The generally flat face 64 serve to prevent rotation of the transfer rod 56 while the groove and land configuration of the face 64 minimizes displacement of the rod in the event of imperfections or the presence of foreign matter between the transfer rod and the pin 62.

The two lands 68 and 70 on the face 66 are flat ground and provide line contact with the pin 62. This arrangement tends to be self-cleaning and prevents sludge from building up in this area. Also, by using two flat lands spaced from one another a stabilizing effect is achieved. This also reduces the effect of asperity on the pin bearing surface. If a single flat surface were employed the effect on the rod from any asperity on the pin bearing surface would be substantially double that which would be produced using the groove and land configuration employed in the present invention. Any asperity present on the pin along the center line of the travel of the transfer rod will have no effect on the transfer rod since it will be in the clearance provided by the groove 66. If a flat surface were used with no central groove, obviously any such central asperity would cause a maximum disturbance on the rod. Any asperity present under one of the lands will have a minimum effect on the rod and would be the same if the face were totally flat. Thus, the total effect on the rod using a centrally groove face will be approximately one-half that which would result from using a completely flat surface.

Figure 4:
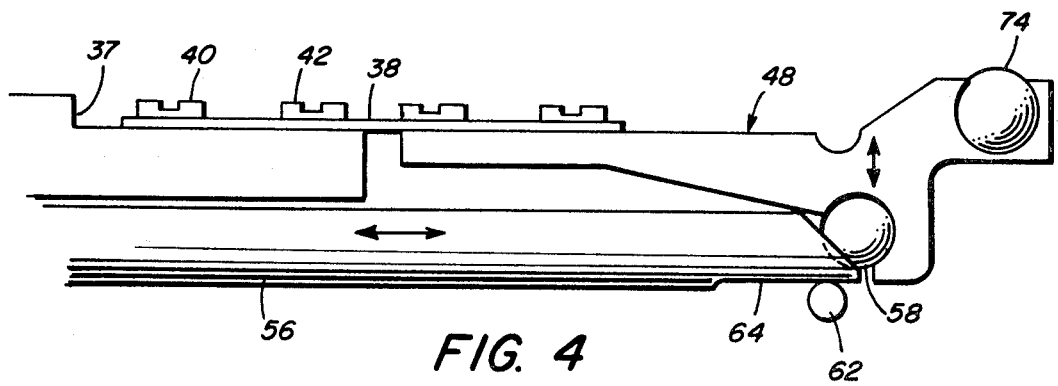
FIG. 4 is a detailed side elevation showing the sensitive finger and transfer rod arrangement.
Figure 7:
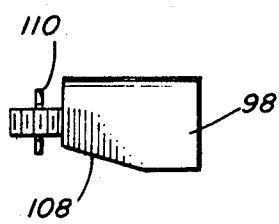
FIG. 7 is a top plan view of the wedge locking mechanism for the FIG. 6 device.

The forward end of the transfer rod is formed with a single Vee-groove 72 diagonally across the tip to bear against the ball 58 shown in FIG. 4. Lapped into the Vee-groove is a pair of parallel semi-cylindrical shallow grooves 59 in which the ball 58 moves and which ensure that the ball 58 always rides in the same track and greatly improves the durability of the instrument.

At the top forward portion of the finger 48 is mounted a sensitive ball contact 74 which is adapted to engage the work surface and through which the finger is biased and the transfer rod 56 moved to actuate the dial indicator. It will be understood that the arcuate motion of the finger 48 will be translated to a linear motion of the transfer rod 56 which, in turn, will produce a measurement display on the dial indicator or digital readout. Both the sensitive ball contact 74 as well as the ball 58 are replaceable in the event that either or both become worn. Upward movement of the sensitive finger 48 is limited by means of a cross pin 75 mounted to the body across the slot 32.

Figure 6:
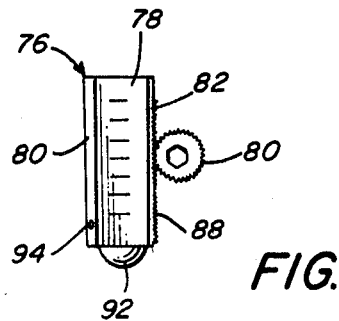
FIG. 6 is a detailed showing of the rack and pinion arrangement for the adjustable stem.
Figure 8:
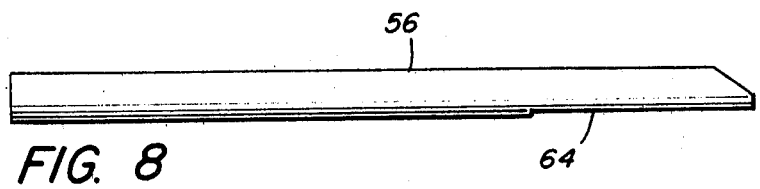
FIG. 8 is a view in side elevation of the transfer rod.
Figure 11:
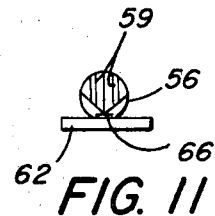
FIG. 11 is an end view of the transfer rod together with the support pin associated therewith.
Figure 9:
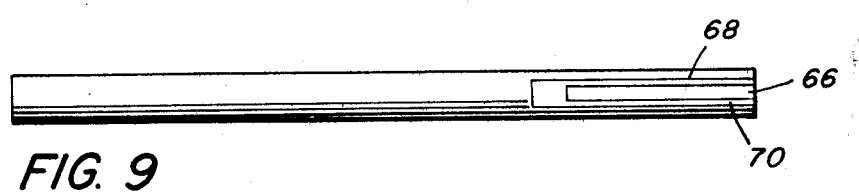
FIG. 9 is a bottom plan view thereof.
Figure 10:
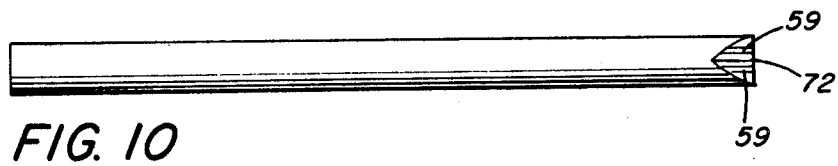
FIG. 10 is a top plan view thereof.

At the forward tip of the body 18 an extensible stem 76 is mounted for limited movement along a path perpendicular to the length of the body and in line with the sensitive ball contact 74. The stem 76, in the illustrated embodiment, is formed with a flat forward face 78, which may be inscribed with graduated markings, and with tapered side walls 80 and 82 forming a wedge configuration that fits smoothly within a guideway formed in the inside faces of the body walls 34 and 36 near the tip. The guideway is comprised of a pair of oppositely facing tapered grooves 84 and 86 which receive the tapered sidewalls 80 and 82 of the stem. The stem is slidably mounted within the groove but its position within the guideway is controlled by means of a pinion 84 rotatably mounted in a corresponding socket 86 formed in the forward tip of the body adjacent to the guideway and in mesh with rack teeth 88 formed along the face 82 of the stem, as best shown in FIG. 6.

The pinion is provided with a hex socket 90 to receive one end of a hex wrench by means of which the pinion may be rotated and thereby move the stem in or out as required in making a preliminary setting of the stem prior to performing a measuring operation. In place of a socket 90 the exposed end may also be slotted or formed with a cross to receive a screwdriver or similar tool to rotate the pinion. In either event the rotation of the pinion and the adjustment of the stem may be carried out with the instrument in place within a setting ring rather than going through a number of adjustments required for conventional screw-type stems common in the art. The lower end of the stem 76 is provided with a ball contact 92 pressed into a cooperating socket formed within the lower end of the stem. The ball may be replaced by forcing the ball out of its socket by inserting a narrow tool into an opening 94 formed in the stem adjacent the upper part of the ball 92.

Mounted on the forward face of the body is a plate 96 which extends partially over the face 78 of the stem and bears Vernier scale markings along the margin thereof by means of which the position of the stem may be visually determined. It will be understood that the stem 76 may be provided in several different lengths for each instrument and that the stems are readily replaced depending upon the dimensions of the work being measured. Once the stem position has been adjusted, it may be locked in position by means of a locking wedge 98. The wedge 98 is mounted within a cutaway portion 100 adjacent to the guideway for the stem and opposite the pinion and is held by means of a locking screw 102 which passes through an opening 104 through the wedge and threadably engages a tapped socket 106 at the rear of the cutaway portion 100. The wedge is formed with a tapered face 108 adapted to engage the tapered face 80 of the stem and by tightening the screw 102 the wedge can lock the stem without causing any disturbance in the position of the stem, holding it firmly in place during measuring operations. The screw 102 is formed with a hex socket in the end thereof or may be provided with a conventional screw head for manipulation by a conventional screwdriver or the like. In practice, an annular spring washer 110 may be mounted on the inner end of the screw 102 between the wedge 98 and the portion around the tapped hole 106 so as to automatically release the wedge when the screw 102 is loosened and permit readjustment of the stem when required. The face 108 preferably is formed with a shallow groove 111 along the center thereof which defines two flats on the wedging face. This increases bearing pressure on the stem and makes the stem more stable. If a simple flat surface on the wedging face were used any slight rounding of the face would produce a line contact with stem and possible rocking thereof.

Figure 13:
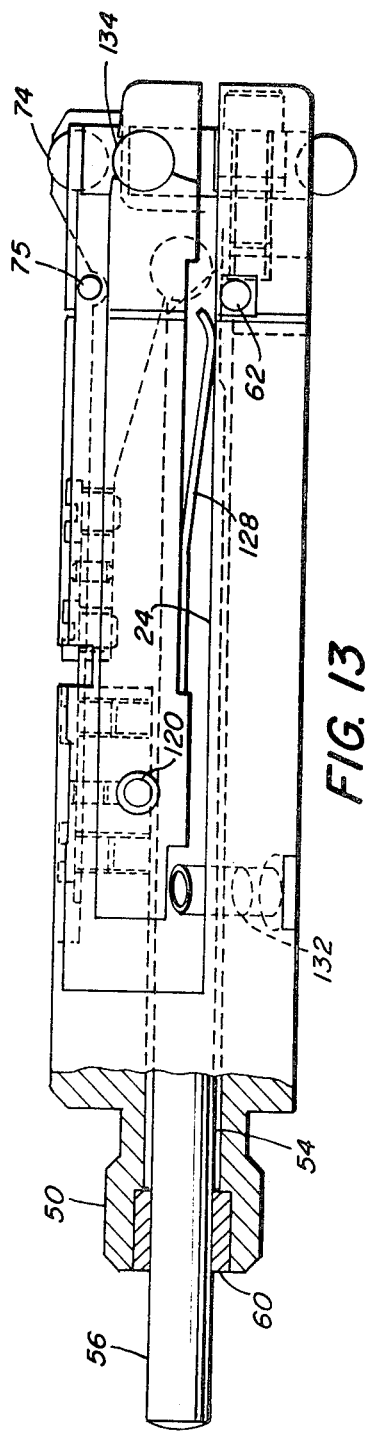
FIG. 13 is a view in side elevation thereof partly broken away, and, FIG. 14 is an end view of the head.

Also mounted to the body 18 and forming part of the head assembly is a U-shaped centralizer arm 112 comprised of a pair of parallel legs 114 and 116 joined by a cross-portion 118. The centralizer arm 112 is pivotally connected to the body portion by means of a pin 120 secured in cooperating holes 122 and 124 of the legs and passing through a hole 126 formed in the body near the rear of the cutaway portions 20 and 22. Preferably, the outer surfaces of the legs 114 and 116 are curved to conform with the overall cylindrical curvature of the body and thereby eliminate any outward projection that might interfere with the taking of measurements in a bore. The dimensions of the legs are such that the centralizer arm fits snugly within the cutaway portions 20 and 22 yet with adequate clearance with the surfaces of the cutaway portions as to allow for free and easy movement of the arm without binding, particularly in the presence of debris, liquid coolants, or the like, that may find their way into the head assembly during normal use of the instrument. The centralizer arm 112 is normally biased in a counterclockwise direction, as viewed in FIGS. 1 and 13, by means of a pair of leaf springs 128 and 130 secured at their inner ends to the lower faces of the arms 114 and 116, respectively, with their forward ends extending diagonally downwards and forwards to terminate in an upwardly curved tip and bearing against the longitudinal shoulders 24 and 26 of the cutaway portions 20 and 22. The upward motion of the centralizer arm 112 is limited by means of a set screw 132 threaded through a tapped opening near the rear of the body 18 with its inner end engaging an inner most end of one of the legs of the centralizer rearwardly of the pivot pin 120, as best shown in FIG. 13. Other means may be provided for limiting the movement of the centralizer arm such as a strut or pin extending across the top of the body over the slot 32, for example. Also, in place of the leaf springs illustrated, other springs means may be provided such as a coil spring arrangement which might extend lengthwise within the body to engage the arm at one end and a fixed portion of the body at another end to provide a bias to the arm.

Figure 3:
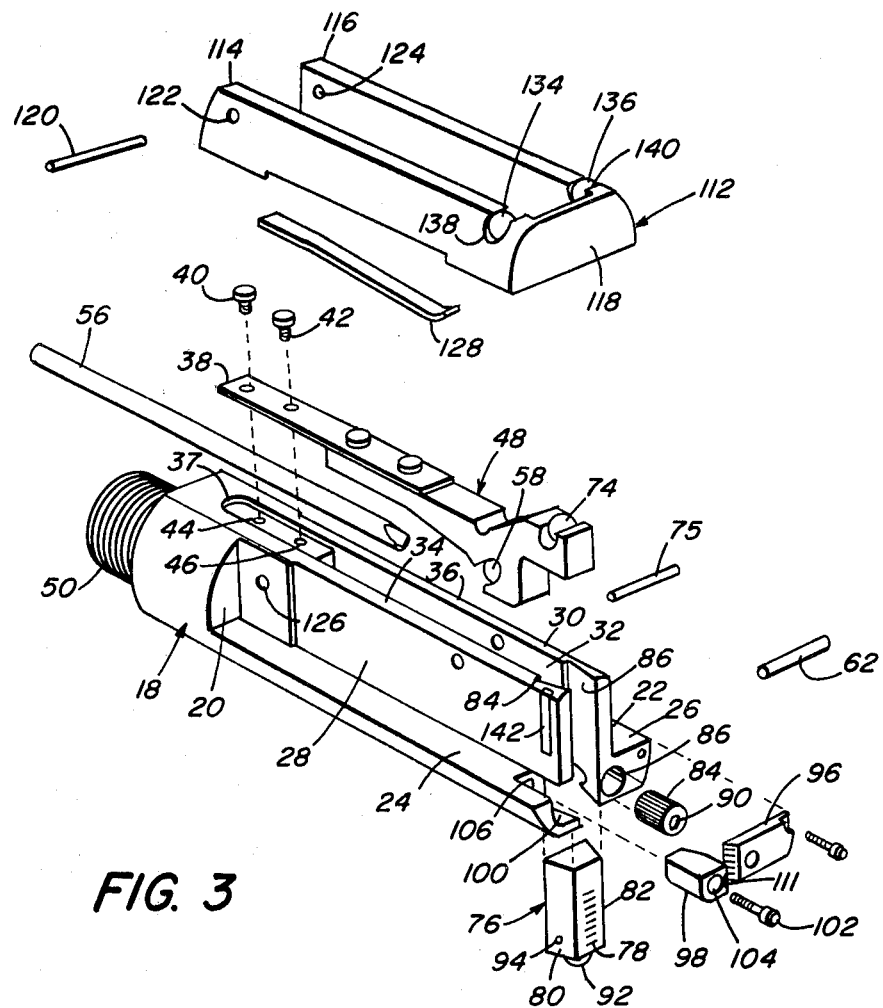
FIG. 3 is an exploded perspective view of the head.
Figure 5:
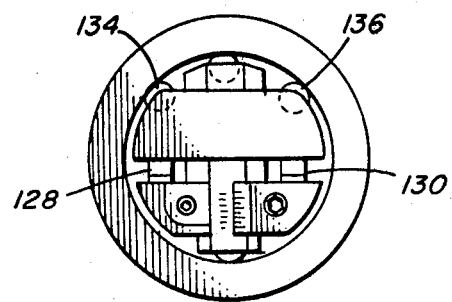
FIG. 5 is an end view of the head assembly in a setting ring.
Figure 12:
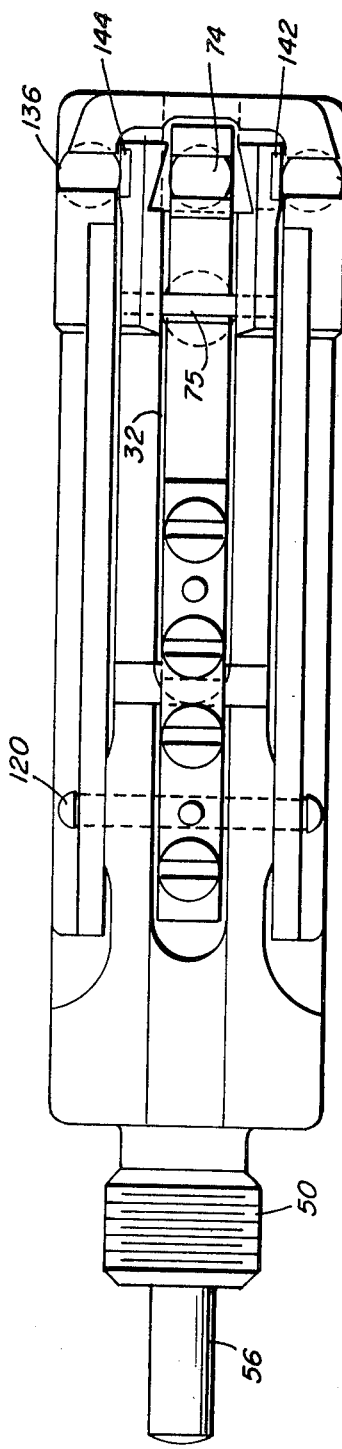
FIG. 12 is a top plan view of the head assembly.
Figure 14:
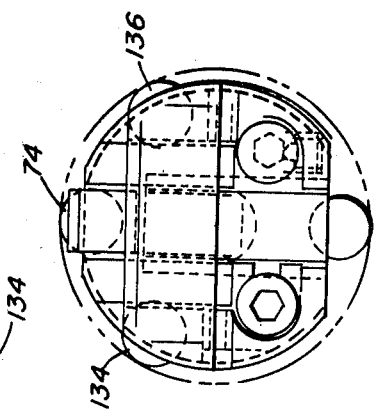

At the forward portion of the centralizing arm near the cross portion 18 is a pair of centralizer balls 134 and 136 mounted for limited transverse movement within semicylindrical grooves 138 and 140, respectively, oriented transversely of the arm. The depth of the grooves is such that a portion of both balls 134 and 136 extends outwardly from the centralizer arm, as best shown in FIGS. 5 and 14, in position to bear against the cylindrical inner face of a bore or reference ring. By mounting the balls 134 and 136 for a limited movement transversely of the arm, they are able to simultaneously bear against the cylindrical wall of the bore and the forward portion of the body 18 along the walls 28 and 30. This ensures very precise positioning of the instrument along the diameter of a bore and locates exactly the measure-making components of the instrument along the diameter of the bore. If the centralizer balls did not bear against the body 18 or were fixed to the centralizer arm, any play between the parts, especially between the arm and the body, could result in the sensing finger 48 being slightly off-center during the actual measurement with resulting error. However, by mounting the balls 134 and 136 for limited movement within their respective grooves, they will, during a centralizing operation and subsequent measurement procedure, engage the walls 28 and 30 of the body as well as the bore walls, holding measuring contacts in a plane precisely along the diameter of the bore. In order to reduce wear on the body, particularly along the lines of contact between the balls 134 and 136 and the body, inserts 142 and 144 of a hard metal such as tungsten carbide or the like may be set into the walls 28 and 30, as best shown in FIGS. 3 and 12. Alternatively, the surface of the walls 28 and 30 along the lines of contact with the centralizer balls may be work hardened during the fabrication of the head assembly. This may be done by pressing the balls tightly against the walls 28, 30 and moving the centralizer arm 112 repeatedly up and down to burnish in a track for the balls.

The instrument is used in the following manner; assuming the proper extension stem 76 is in place, the head is inserted in a selected reference ring and the centralizer arm will locate the sensitive elements, namely the balls contacts 74 and 92 along the diameter of the reference ring. The stem 94 is moved in or out as required to adjust the instrument to the reference ring, this being done with the head assembly in place and by simply turning the pinion 84 one way or the other. Once the extent of the stem is selected, the stem is locked in position by tightening up the screw 102 to engage the wedge 98. The instrument is then withdrawn from the reference ring and inserted in the bore that is to be measured. The centralizer balls will precisely orient the instrument in a plane along the diameter of the bore and the axial centerline of the bore is established by rocking the instrument slightly up and down within the bore to define the smallest measurement on the dial indicator or other measuring instrument. This will represent the precise diameter of the bore.

While the invention has been described with particular reference to the illustrated embodiment, numerous modifications thereto will appear to those skilled in the art.

Having thus described the invention, what I claim and desire to obtain by Letters Patent of the United States is:

1. A head for a bore gauge having a movable member therein adapted to produce an indication of measurement corresponding to the extent of displacement of said member, said head comprising
 (a) a body;
 (b) connecting means for operatively connecting said body to said gauge;
 (c) a transfer rod mounted for limited longitudinal movement in said body and drivingly connected at one end to said member;

(d) a bore-engaging sensing member movably mounted to the distal end of said body and drivingly connected to the other end of said rod;

(e) an adjustable bore-engaging element mounted to the distal end of said body on the opposite side of said head in diametrical alignment with said sensing member;

(f) manually actuated rack and pinion means operatively associated with said element for exending and retracting said element diametrically to and away from said body;

(g) centralizing means connected to said body for engaging the walls of said bore and positioning said sensing member and said element along the diameter of said bore; and (h) locking means mounted to said body and engageable with said element for locking said element at a selected position.

2. A head according to claim 1 wherein said rack and pinion means includes rack teeth formed lengthwise of said element parallel to the path of travel thereof and a pinion rotatably mounted in the distal end of said body and in mesh with said rack teeth, said pinion being manually rotatable from said distal end.

3. A head according to claim 1 wherein said other end of said transfer rod is formed with a diagonally extending V groove, said sensing member being resiliently and pivotally mounted to said body and including a spherical portion seated in said groove whereby any pivotal movement of said sensing member is converted to a linear movement of said rod, said head further including a support member mounted to said body transversely of said rod and engaging said rod along one side thereof adjacent said other end and opposite said groove to provide sliding support for said rod, wherein said rod is formed with a generally flat face along said one side, said face being formed with a longitudinal groove and a pair of spaced parallel narrow longitudinal ribs slidably engaging said support member.

4. A head according to claim 3 wherein said support member is a rigid cylindrical pin.

5. A head according to claim 3 including a first hard ball contact replacably mounted for quick and easy removal within said sensing member in position to engage said bore and diametrically opposite said adjustable element.

6. A head according to claim 5 including a second hard ball contact replaceably mounted for quick and easy removal within the outer end of said adjustable element in position to engage said bore and diametrically opposite said first ball contact.

7. A head according to claim 3 wherein a semi-cylindrical groove is formed lengthwise in each face of said V groove to define a pair of spaced parallel semi-cylindrical grooves along which said spherical portion is adapted to move.

8. A head according to claim 1 wherein said centralizing means includes a U-shaped arm having a pair of parallel legs and a cross-piece at one end thereof, pivot means connecting the other end of said legs to said body with said legs extending generally parallel to said rod and along opposite sides of said body and with said cross-piece disposed proximate the distal end of said body, spring means between said arm and said body urging said one end of said arm away from the distal end of said body, and wherein said arm is formed with a groove in each leg thereof at said one end and extending transversely of said legs, a centralizing ball mounted for limited transverse movement in each of said grooves, each of said centralizing balls having a portion thereof extending outwardly of its respective groove to simultaneously bear against said body and said bore when said head is within said bore.

9. A head according to claim 8 wherein said centralizing balls and said first and second ball contacts are disposed in the same plane.

10. A head according to claim 8 wherein said body includes a hardened metal track adjacent each of said centralizing balls for engagement therewith.

11. A head according to claim 8 including stop means operatively connected to said head for limiting the movement of said arm about said pivot means.

12. A head for a bore gauge having a movable member therein adapted to produce an indication of measurement corresponding to the extent of displacement of said member said head comprising (a) a body;

(b) connecting means for operatively connecting said body to said gauge;

(c) a transfer rod mounted for limited longitudinal movement in said body and drivingly connected at one end to said member;

(d) a bore-engaging sensing member movably mounted to the distal end of said body and drivingly connected to the other end of said rod;

(e) an adjustable bore-engaging element mounted to the distal end of said body on the opposite side of said head in diametrical alignment with said sensing member;

(f) manually actuated rack and pinion means operatively associated with said element for extending and retracting said element diametrically to and away from said body;

(g) centralizing means connected to said body for engaging the walls of said bore and positioning said sensing member and said element along the diameter of said bore;

(h) said rack and pinion means including rack teeth formed lengthwise of said element parallel to the path of travel thereof and a pinion rotatably mounted in the distal end of said body and in mesh with said rack teeth, said pinion being manually rotatable from said distal end;

(i) locking means mounted to said body and engageable with said element for locking said element at a selected position;

(j) said locking means including a wedge mounted in said distal end adjacent said element and engageable therewith, and a screw extending through said wedge and threaded to said body whereby said wedge may be selectively tightened against said element and loosed therefrom.

13. A head according to claim 12 wherein said wedge is formed with an element-engaging face having at least one groove defining at least a pair of lands in position to engage said element.

14. A head according to claim 12 including spring means operatively mounted between said wedge and said body for normally urging said wedge into a loosed position.

15. A head for a bore gauge having a movable member therein adapted to produce an indication of measurement corresponding to the extent of displacement of said member, said head comprising (a) a body, (b) connecting means for operatively connecting said body to said gauge, (c) a transfer rod mounted for limited longitudinal movement in said body and drivingly connected at one end to said member, (d) a bore engaging sensing member movably and resiliently mounted to the distal end of said body and at one side thereof and drivingly connected to the other end of said rod, (e) an adjustable bore-engaging element mounted to the distal end of said body on the opposite side of said head in diametrical alignment with said sensing member, (f) a U-shaped centralizing arm having a pair of parallel legs and a cross-piece at one end thereof, pivot means connecting the other ends of said legs to said body with said legs extending generally parallel to said rod and along opposite sides of said body and said element and with said cross-piece disposed proximate the distal end of said body, (g) spring means connected between said arm and said body urging said one end of said arm away from the distal end of said body, (h) said arm being formed with a groove in each leg thereof at said one end and extending transversely of said legs, and, (i) a centralizing ball mounted for limited transverse movement in each of said grooves, each of said centralizing balls having a portion thereof extending outwardly of the respective groove to simultaneously bear against said body and said bore when said head is within said bore.

16. A head according to claim 15 wherein said body includes a hardened metal track adjacent each of said centralizing balls for engagement therewith.

17. A head according to claim 15 including stop means operatively connected to said head for limiting the movement of said arm about said pivot means.

18. A head according to claim 15 wherein said other end of said transfer rod is formed with a diagonally extending V groove, said sensory member being pivotally mounted to said body and including a spherical portion seated in said groove whereby any pivotal movement of said sensing member is converted to a linear movement of said rod.

19. A head according to claim 18 including a first hard ball contact mounted to said sensory member in position to engage said bore and diametrically opposite said adjustable element.

20. A head according to claim 19 including a second ball contact at the outer end of said adjustable element in position to engage said bore and diametrically opposite said first ball contact.

21. A head according to claim 20 wherein said centralizing balls and said first and second ball contacts are disposed in the same plane.

22. A head according to claim 18 including a leaf spring connecting said sensory member to said body, said leaf spring extending generally parallel to said rod and in position to deflect to and away from said rod.

23. A head according to claim 18 wherein a semi-cylindrical groove is formed lengthwise in each face of said V groove to define a pair spaced parallel semi-cylindrical grooves along which said spherical portion is adapted to move.

24. A head for a bore gauge having a movable member therein adapted to produce an indication of measurement corresponding to the extent of displacement of said member said head comprising (a) a body;

(b) connecting means for operatively connecting said body to said gauge;

(c) a transfer rod mounted for limited longitudinal movement in said body and drivingly connected at one end to said member;

(d) a bore engaging sensing member movably and resiliently mounted to the distal end of said body and at one side thereof and drivingly connected to the other end of said rod;

(e) an adjustable bore-engaging element mounted to the distal end of said body on the opposite side of said head in diametrical alignment with said sensing member;

(f) a U-shaped centralizing arm having a pair of parallel legs and a cross-piece at one end thereof, pivot means connecting the other ends of said legs to said body with said legs extending generally parallel to said rod and along opposite sides of said body and said element and with said cross-piece disposed proximate the distal end of said body;

(g) spring means connected between said arm and said body urging said one end of said arm away from the distal end of said body;

(h) said arm being formed with a groove in each leg thereof at said one end and extending transversely of said legs;

(i) a centralizing ball mounted for limited transverse movement in each of said grooves, each of said centralizing balls having a portion thereof extending outwardly of the respective groove to simultaneously bear against said body and said bore when said head is within said bore;

(j) said other end of said transfer rod is formed with a diagonally extending V groove, said sensory member being pivotally mounted to said body and including a spherical portion seated in said groove whereby any pivotal movement of said sensing member is converted to a linear movement of said rod; and (k) a support member mounted to said body transversely of said rod and engaging said rod along one side thereof adjacent said other end and opposite said groove to provide sliding support for said rod.

25. A head according to claim 24 wherein said rod is formed with a generally flat face along said one side, said face being formed with a longitudinal groove and a pair of spaced parallel narrow longitudinal ribs slidably engaging said support member.

26. A head according to claim 25 wherein said support member is a rigid cylindrical pin.

* * * * *